United States Patent
Yang (10) Patent No.: US 10,216,299 B2
(45) Date of Patent: Feb. 26, 2019

(54) TRANSPARENT CONDUCTIVE OXIDE PATTERN BLANKING STRUCTURE, TOUCH PANEL AND DISPLAY DEVICE

(71) Applicants: Boe Technology Group Co., Ltd., Beijing (CN); Hefei Xinsheng Optoelectronics Technology Co. Ltd., Anhui (CN)

(72) Inventor: Wenjuan Yang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 447 days.

(21) Appl. No.: 14/913,282

(22) PCT Filed: Aug. 20, 2015

(86) PCT No.: PCT/CN2015/087634
§ 371 (c)(1),
(2) Date: Feb. 19, 2016

(87) PCT Pub. No.: WO2016/131231
PCT Pub. Date: Aug. 25, 2016

(65) Prior Publication Data
US 2016/0364033 A1    Dec. 15, 2016

(30) Foreign Application Priority Data
Feb. 17, 2015    (CN) .......................... 2015 1 0085551

(51) Int. Cl.
G06F 3/041    (2006.01)
G06F 3/044    (2006.01)

(52) U.S. Cl.
CPC .............. *G06F 3/041* (2013.01); *G06F 3/044* (2013.01); *G06F 2203/04103* (2013.01); *G06F 2203/04111* (2013.01)

(58) Field of Classification Search
None
See application file for complete search history.

(56) References Cited

U.S. PATENT DOCUMENTS

2007/0236618 A1    10/2007    Maag et al.
2010/0013784 A1*   1/2010     Nashiki .................. C23C 14/08
                                                          345/173
(Continued)

FOREIGN PATENT DOCUMENTS

CN    1636914      7/2005
CN    101055321    10/2007
(Continued)

OTHER PUBLICATIONS

Third Office Action from Chinese Application No. 201510085551.7 dated Oct. 25, 2017.
(Continued)

*Primary Examiner* — John J Figueroa
(74) *Attorney, Agent, or Firm* — Calfee, Halter & Griswold LLP (57) ABSTRACT

The present invention discloses a transparent conductive oxide pattern blanking structure, a touch panel, and a display device. A patterned transparent conductive oxide layer is stacked on a base plate, and a pattern blanking layer is adapted to make a pattern of the transparent conductive oxide layer invisible in the visible light. Thus, the pattern blanking layer as a whole layer can be formed during fabricating the pattern of the transparent conductive oxide layer, and there is no need for an attaching or patterning process. Thus, an effect of making the pattern of the transparent conductive oxide layer become invisible in the visible
(Continued)

light from clearly visible can be achieved at a low fabricating cost.

14 Claims, 5 Drawing Sheets

(56) References Cited

U.S. PATENT DOCUMENTS

| | | | | |
|---|---|---|---|---|
| 2013/0048348 A1* | 2/2013 | Yamazaki | ............... | G06F 3/041 174/254 |
| 2013/0113757 A1* | 5/2013 | Tanaka | ................... | G06F 3/044 345/174 |
| 2015/0002760 A1* | 1/2015 | Morimoto | ........... | G02F 1/13338 349/12 |
| 2015/0062710 A1* | 3/2015 | Grillmayer | ......... | H01J 37/3405 359/585 |

FOREIGN PATENT DOCUMENTS

| | | |
|---|---|---|
| CN | 101078820 | 11/2007 |
| CN | 201757892 | 3/2011 |
| CN | 102629175 | 8/2012 |
| CN | 203376717 U | 1/2014 |
| CN | 103699286 A | 4/2014 |
| CN | 203673462 | 6/2014 |
| CN | 203673462 U | 6/2014 |
| CN | 104571721 | 4/2015 |
| JP | 2004246420 | 9/2004 |
| JP | 2009104927 | 5/2009 |

OTHER PUBLICATIONS

Office Action from China Application No. 201510085551.7 dated Feb. 15, 2017.
International Search Report from PCT/CN15/87634 dated Nov. 24, 2015.
Second Office Action from Chinese Application No. 201510085551.7 dated Jun. 6, 2017.
Decision of Rejection for Chinese Application No. 201510085551.7 dated Apr. 3, 2018.

* cited by examiner

| SiO₂ |
|---|
| bridging layer |
| insulating layer |
| transparent conductive oxide layer |
| SiO₂ |
| Nb₂O₅ |
| BM |
| base plate |

Fig. 6b

TRANSPARENT CONDUCTIVE OXIDE PATTERN BLANKING STRUCTURE, TOUCH PANEL AND DISPLAY DEVICE

RELATED APPLICATIONS

The present application is the U.S. national phase entry of PCT/CN2015/087634 with an International filing date of Aug. 20, 2015, which claims the benefit of Chinese Application No. 201510085551.7, filed Feb. 17, 2015, the entire disclosures of which are incorporated herein by reference.

FIELD OF THE INVENTION

The present invention relates to the field of display technology, and particularly to a transparent conductive oxide pattern blanking structure, a touch panel, and a display device.

BACKGROUND OF THE INVENTION

Figure 1:
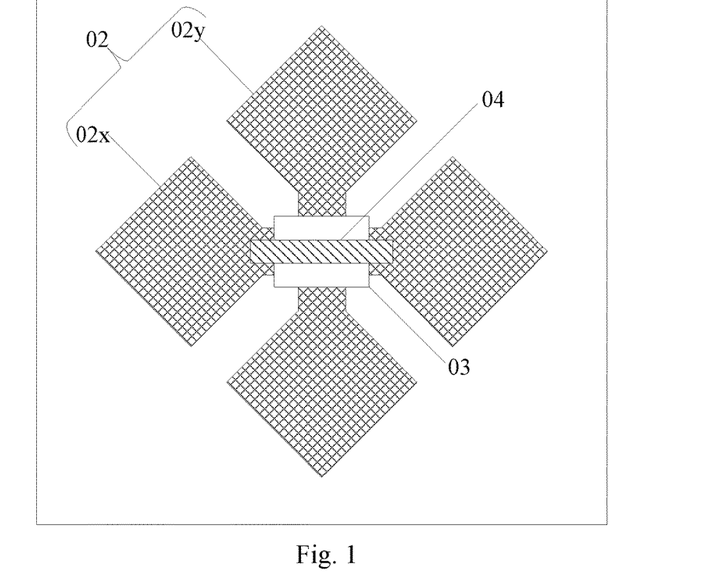
FIG. 1 is a top view for a touch panel in the prior art.
Figure 2A:
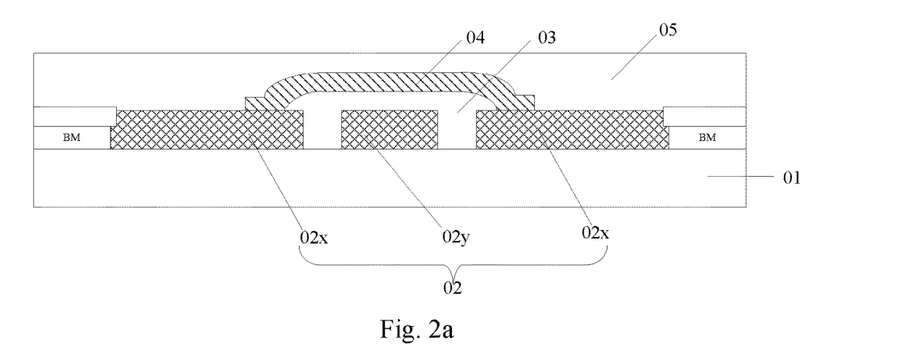
FIG. 2a and FIG. 2b are side views for a touch panel in the prior art respectively.
Figure 2B:
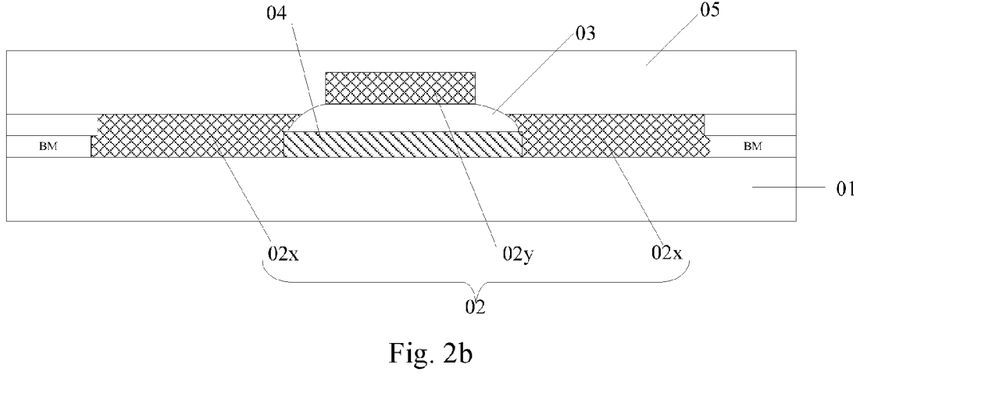

Currently, transparent conductive oxide materials like Indium Tin Oxide (ITO) have been widely applied to a display device as transparent electrodes, especially as touch electrodes (touch sensor) in a touch panel, due to their stable chemical performance and high conductivity. In particular, as shown in FIG. 1, a basic structure of the touch panel comprises on a base plate 01, a transparent conductive oxide layer 02 comprising a touch electrode pattern 02x in the X direction and a touch electrode pattern 02y in the Y direction, an insulating layer 03, a bridging layer 04 for bridging touch electrodes in the X or Y direction, and a wiring layer in a peripheral region. The touch panel can adopt arrangement manners shown in FIG. 2a and FIG. 2b. As shown in FIG. 2a, the bridging layer 04 is arranged on the transparent conductive oxide layer 02. As shown in FIG. 2b, the bridging layer 04 is arranged below the transparent conductive oxide layer 02.

In case a touch electrode pattern is formed by a transparent conductive oxide layer in the above-mentioned touch panel, due to the specific color of the transparent conductive oxide in the pattern, the pattern is easily noticed by naked eyes in the ambient light, and thus is not acceptable by the customer. Therefore, as a common solution, some layers 05 are attached or arranged on the touch panel.

Figure 3A:
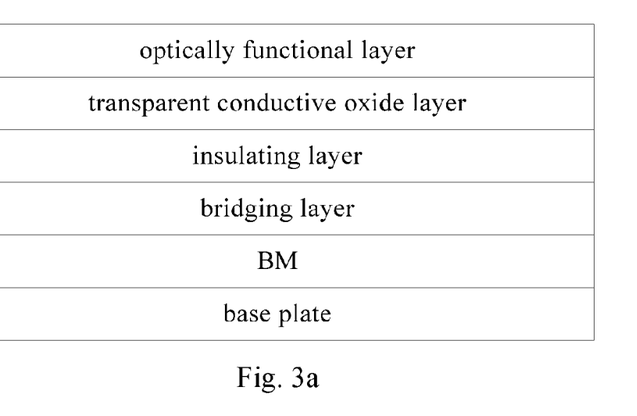
FIG. 3a, FIG. 3b, and FIG. 3c are structural views for a touch panel with a pattern blanking function in the prior art respectively.
Figure 3B:
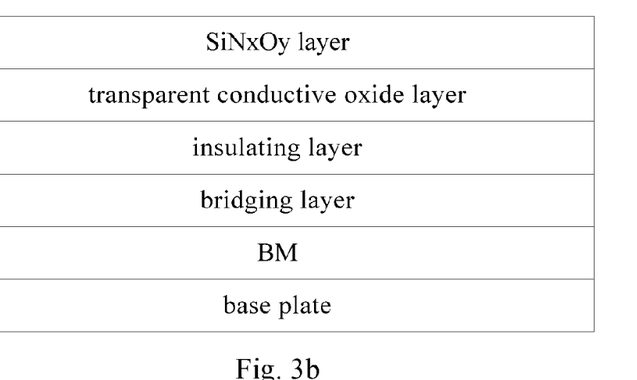
Figure 3C:
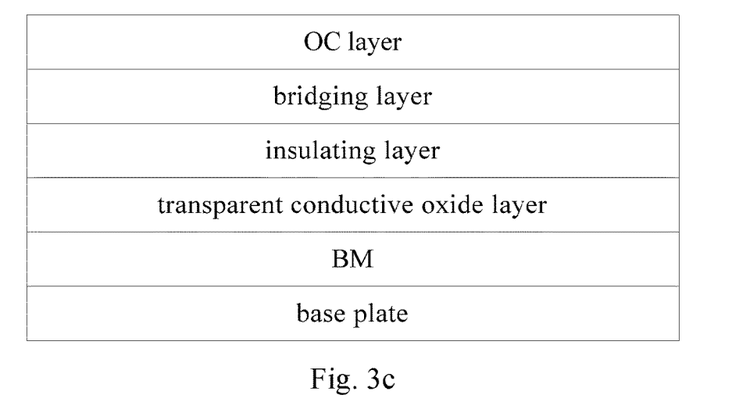

According to the sequence for arranging layers in the touch panel, the above solution for example can be realized in the following three manners. As shown in FIG. 3a, an optically functional layer is attached on the touch panel to achieve the pattern blanking effect. This is advantageous in that the process for attaching is simple. However, the functional layer significantly reduces light transmittance of the touch panel, and traces of wear easily develop on a surface of the touch panel after using for a long time. As shown in FIG. 3b, a SiNxOy layer is formed on the transparent conductive oxide layer of the touch panel. As shown in FIG. 3c, an OC layer (over-coating layer, which generally is made from an organic material) is formed on the bridging layer of the touch panel. In this case, the blanking effect of the OC layer is made use of. An additional mask process is required for forming the OC layer during fabricating the touch panel. If a photo process is used in the mask process, the investment in equipment is increased, and the fabricating cost is increased accordingly.

Therefore, it is a transparent conductive oxide layer with a better blanking effect and reduced cost is of benefit to one skilled in the art.

SUMMARY OF THE INVENTION

In view of this, embodiments of the present invention provide a transparent conductive oxide pattern blanking structure, a touch panel, and a display device, for purpose of alleviating or eliminating one or more the above problems. In particular, in embodiments of the present invention, a transparent conductive oxide layer with a better blanking effect and a lower cost can be achieved.

In a first aspect, an embodiment of the present invention provides a transparent conductive oxide pattern blanking structure, comprising a base plate, a patterned transparent conductive oxide layer which is stacked on the base plate, and a pattern blanking layer which is adapted to make a pattern of the transparent conductive oxide layer invisible in the visible light.

In a possible implementation, in the above-mentioned transparent conductive oxide pattern blanking structure, the pattern blanking layer comprises at least one dielectric layer group which is arranged between the base plate and the transparent conductive oxide layer, wherein each of the dielectric layer group comprises at least two dielectric layers which are stacked and have refractive indices decreasing successively in a direction from the base plate to the transparent conductive oxide layer.

In a possible implementation, in the above-mentioned transparent conductive oxide pattern blanking structure, each of the dielectric layer group comprises a first dielectric layer and a second dielectric layer on the first dielectric layer, wherein the second dielectric layer has a refractive index smaller than that of the first dielectric layer. In a possible implementation, in the above-mentioned transparent conductive oxide pattern blanking structure, the first dielectric layer has a refractive index of 1.9-2.2, and the second dielectric layer has a refractive index of 1.4-1.6.

In a possible implementation, in the above-mentioned transparent conductive oxide pattern blanking structure, the first dielectric layer is made from $Nb_2O_5$, and the second dielectric layer is made from $SiO_2$.

In a possible implementation, in the above-mentioned transparent conductive oxide pattern blanking structure, the pattern blanking layer further comprises a third dielectric layer which is arranged on a side of the transparent conductive oxide layer away from the dielectric layer group, wherein the third dielectric layer has a refractive index smaller than that of the transparent conductive oxide layer.

In a possible implementation, in the above-mentioned transparent conductive oxide pattern blanking structure, the transparent conductive oxide layer has a refractive index of 1.9, and the third dielectric layer has a refractive index of 1.4-1.9.

In a possible implementation, in the above-mentioned transparent conductive oxide pattern blanking structure, the third dielectric layer is made from one of $SiO_2$, SiNx, SiNxOy, organic material, or a combination thereof.

In a possible implementation, in the above-mentioned transparent conductive oxide pattern blanking structure, the pattern blanking layer further comprises optically clear resin (OCR, also referred to as optical transparent resin) which is arranged on a side of the third dielectric layer away from the transparent conductive oxide layer.

In a possible implementation, in the above-mentioned transparent conductive oxide pattern blanking structure, the pattern blanking layer comprises a fourth dielectric layer and optically clear resin which are arranged on the transparent conductive oxide layer successively, wherein the fourth dielectric layer has a refractive index smaller than that of the transparent conductive oxide layer.

In a possible implementation, in the above-mentioned transparent conductive oxide pattern blanking structure, the transparent conductive oxide layer has a refractive index of 1.9, and the fourth dielectric layer has a refractive index of 1.5-1.9.

In a possible implementation, in the above-mentioned transparent conductive oxide pattern blanking structure, the fourth dielectric layer is made from SiOxNy.

In a possible implementation, in the above-mentioned transparent conductive oxide pattern blanking structure, the transparent conductive oxide layer is made from ITO.

In a possible implementation, in the above-mentioned transparent conductive oxide pattern blanking structure, the first dielectric layer is made from $Nb_2O_5$ with a thickness of 80~130 Å, the second dielectric layer is made from $SiO_2$ with a thickness of 400~500 Å, the transparent conductive oxide layer is made from ITO with a thickness of 400~500 Å, and the third dielectric layer is made from $SiO_2$ with a thickness of 400~500 Å.

In a second aspect, an embodiment of the present invention further provides a touch panel which comprises the above-mentioned transparent conductive oxide pattern blanking structure.

In a third aspect, an embodiment of the present invention further provides a display device which comprises the above-mentioned transparent conductive oxide pattern blanking structure.

Embodiments of the present invention have the following beneficial effects. The present invention provides a transparent conductive oxide pattern blanking structure, a touch panel, and a display device. A patterned transparent conductive oxide layer is stacked on a base plate, and a pattern blanking layer is adapted to make a pattern of the transparent conductive oxide layer invisible in the visible light. Thus, the pattern blanking layer as a whole layer can be formed during fabricating the pattern of the transparent conductive oxide layer, and there is no need for an attaching or patterning process. Thus, an effect of making the pattern of the transparent conductive oxide layer become invisible in the visible light from clearly visible can be achieved at a low fabricating cost.

DETAILED DESCRIPTION OF THE INVENTION

In order to make objects, technical solutions and advantages of the present invention more clear, embodiments of the present invention will be described in details hereinafter in conjunction with the accompanying drawings.

In drawings, the thickness and shape of respective layer do not reflect the actual proportion of the transparent conductive oxide pattern blanking structure, but to schematically illustrate the content of the present invention.

An embodiment of the present invention provides a transparent conductive oxide pattern blanking structure, comprising a base plate, a patterned transparent conductive oxide layer which is stacked on the base plate, and a pattern blanking layer which is adapted to make a pattern of the transparent conductive oxide layer invisible in the visible light.

In the above-mentioned transparent conductive oxide pattern blanking structure, a patterned transparent conductive oxide layer is stacked on a base plate, and a pattern blanking layer is adapted to make a pattern of the transparent conductive oxide layer invisible in the visible light. Thus, the pattern blanking layer as a whole layer can be formed during fabricating the pattern of the transparent conductive oxide layer, and there is no need for an attaching or patterning process. Thus, an effect of making the pattern of the transparent conductive oxide layer become invisible in the visible light from clearly visible can be achieved at a low fabricating cost.

In implementations, in the above-mentioned transparent conductive oxide pattern blanking structure, the pattern blanking layer for eliminating the transparent conductive oxide pattern structure can have two kinds of structure, which will be elucidated hereinafter with reference to a first embodiment and a second embodiment.

First Embodiment

Figure 4A:
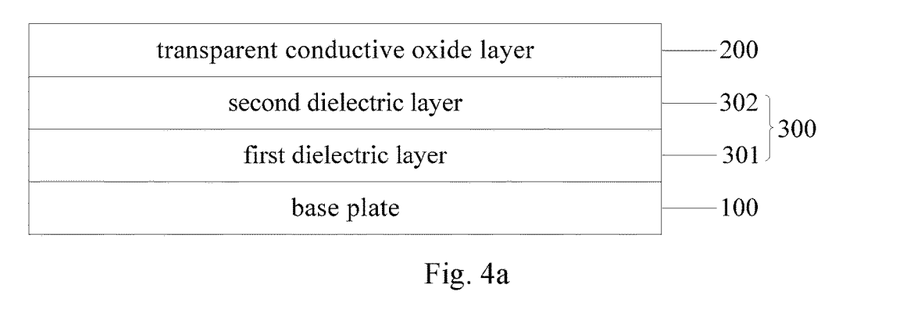
FIG. 4a, FIG. 4b, and FIG. 4c are structural views for a transparent conductive oxide pattern blanking structure in an embodiment of the present invention respectively.

In particular, in the above-mentioned transparent conductive oxide pattern blanking structure, as shown in FIG. 4a, the pattern blanking layer comprises at least one dielectric layer group 300 which is arranged between a base plate 100 and a transparent conductive oxide layer 200. Each of the dielectric layer group 300 comprises at least two dielectric layers which are stacked and have refractive indices decreasing successively in a direction from the base plate 100 to the transparent conductive oxide layer 200.

It is noted that, the refractive indices of the at least two dielectric layers comprised by each dielectric layer group can decrease successively in a same or different manner. Namely, one of the dielectric layers comprised by a dielectric layer group can have a same refractive index as that of a corresponding dielectric layer in another dielectric layer group, or have a refractive index different that of the latter. For example, the pattern blanking layer comprises two dielectric layer groups, and each dielectric layer group comprises two dielectric layers. Namely, the pattern blanking layer comprises four dielectric layers in total. These four dielectric layers can have refractive indices of n1, n2, n1, n2, wherein n1>n2. These four dielectric layers can also have refractive indices of n1, n2, n3, n4, wherein n1>n2, n3>n4, and there is no restriction to the value of n2 and n3.

In the above-mentioned transparent conductive oxide pattern blanking structure, the pattern blanking layer comprises at least two dielectric layers which are arranged between the base plate 100 and the transparent conductive oxide layer 200 and have refractive indices which decrease successively in a direction from the base plate to the transparent conductive oxide layer. Thus, at least one dielectric layer group is introduced in the pattern blanking layer, and the at least one dielectric layer group comprises a plurality of dielectric layers with decreasing refractive indices. According to the principle of destructive interference of light, the visible light is subject to mutual interference during multiple reflections in the dielectric layer group. In particular, the at least two dielectric layers have refractive indices which decrease successively in a direction from the base plate to the transparent conductive oxide layer. As for the visible light incident from the transparent conductive oxide layer, the at least two dielectric layers can reduce reflectivity of the incident visible light, acting as an antireflection coating (AR coating). Thereby, the transparent conductive oxide layer pattern can be made invisible, and a blanking level of the product is effectively increased. By setting the thickness of each dielectric layer in the dielectric layer group, the reflectivity of the incident visible light can reach a minimal value. On basis of this, by setting the refractive index of each dielectric layer in the dielectric layer group, the minimal value of the reflectivity for the incident visible light can approach 0, so that the pattern blanking effect of the present invention is optimized.

Further, in the above-mentioned transparent conductive oxide pattern blanking structure, as shown in FIG. 4a, each dielectric layer group comprises a first dielectric layer 301 and a second dielectric layer 302 on the first dielectric layer 301. The second dielectric layer 302 has a refractive index smaller than that of the first dielectric layer 301.

In implementations, in order to optimize the pattern blanking effect of the above-mentioned transparent conductive oxide pattern blanking structure, it is essential to select appropriate refractive indices for the first dielectric layer 301 and the second dielectric layer 302. In general, the refractive index of the second dielectric layer 302 should be smaller than that of the first dielectric layer 301. In implementations, the refractive index of the first dielectric layer 301 can be 1.9-2.2 and the refractive index of the second dielectric layer 302 can be 1.4-1.6, for achieving good pattern blanking effect. In the above ranges of refractive indices, there are many choices for the material of the first and second dielectric layer 301, 302. For example, the material of the first dielectric layer 301 can be $Nb_2O_5$, and the material of the second dielectric layer 302 can be $SiO_2$.

Figure 4B:
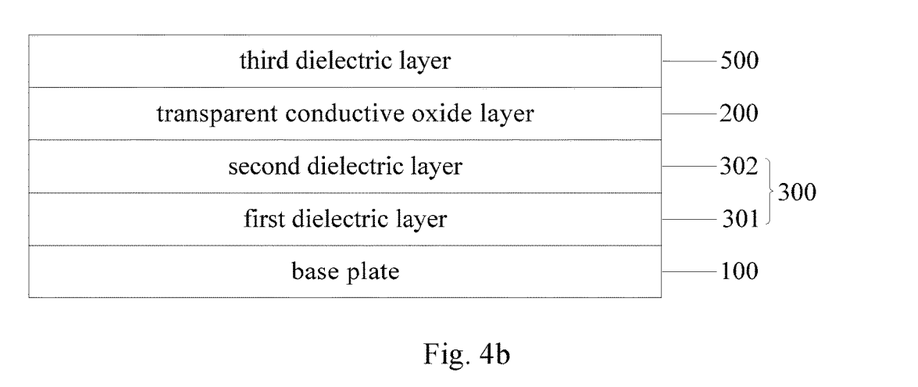

In order to further enhance the light transmittance of the transparent conductive oxide pattern blanking structure, as shown in FIG. 4b, the pattern blanking layer can further comprise a third dielectric layer 500 which is arranged at a side of the transparent conductive oxide layer 200 away from the dielectric layer group 300. By following similar rules for setting refractive indices of layers in the above-mentioned dielectric layer group, the third dielectric layer 500 is arranged on the transparent conductive oxide layer 200 and has a refractive index smaller than that of the transparent conductive oxide layer 200. For example, in case the transparent conductive oxide layer 200 is made from ITO and has a refractive index of 1.9, the third dielectric layer 500 can have a refractive index of 1.4-1.9. By arranging the third dielectric layer 500 on the transparent conductive oxide layer 200, the blanking effect and light transmittance of the transparent conductive oxide pattern blanking structure can be further improved. For example, the light transmittance of the product can be increased from 84% to 94%.

In implementations, in the above ranges of refractive indices, there are many choices for the material of the third dielectric layer 500. For example, the material of the third dielectric layer 500 can be one of $SiO_2$, SiNx, SiNxOy, organic material, or a combination thereof.

Figure 4C:
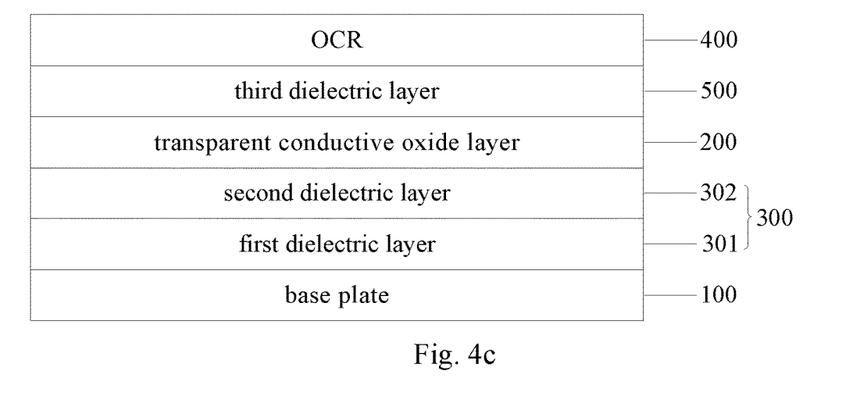

To further enhance the pattern blanking effect of the transparent conductive oxide pattern blanking structure, for purpose of providing an invisible fully-attached product, as shown in FIG. 4c, the pattern blanking layer can further comprise an optically clear resin 400 which is arranged on the third dielectric layer 500.

In implementations, the thickness of each layer in the above-mentioned transparent conductive oxide pattern blanking structure can be set appropriately according to the thickness of the transparent conductive oxide layer 200. For example, in case 80~130 Å $Nb_2O_5$, 400~500 Å $SiO_2$, 400~500 Å ITO, 400~500 Å $SiO_2$ are arranged on the base plate successively, the transparent conductive oxide pattern blanking structure can have a light transmittance up to 94%, and the pattern blanking structure can make the ITO pattern completely invisible in the visible light.

It is noted that in the transparent conductive oxide pattern blanking structure, an additional layer can be arranged between respective layers as needed, provided that the layer neither has the characteristics of the above-mentioned blanking layer nor has a large area, and the effect of pattern blanking would not be affected.

Second Embodiment

Figure 5:
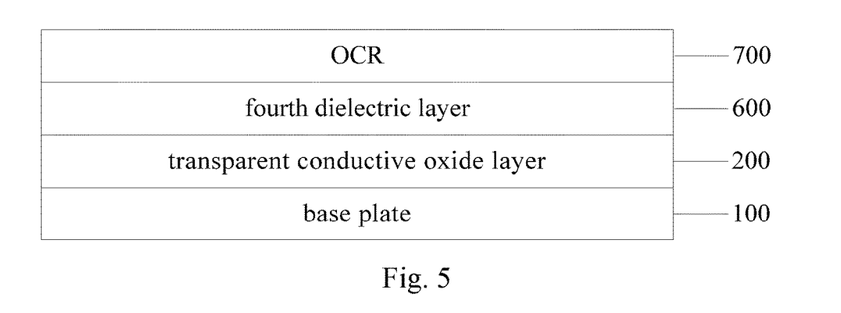
FIG. 5 is a structural view for another transparent conductive oxide pattern blanking structure in an embodiment of the present invention.

In particular, in the above-mentioned transparent conductive oxide pattern blanking structure, as shown in FIG. 5, the pattern blanking layer can comprise a fourth dielectric layer 600 and an optically clear resin 700 which are arranged on the transparent conductive oxide layer 200 successively. By following similar rules for setting refractive indices of layers in the above-mentioned third dielectric layer 500, the fourth dielectric layer 600 is arranged on the transparent conductive oxide layer 200 and has a refractive index smaller than that of the transparent conductive oxide layer 200. For example, in case the transparent conductive oxide layer 200 is made from ITO and has a refractive index of 1.9, the fourth dielectric layer 600 can have a refractive index of 1.5-1.9.

As compared with the first embodiment, in the pattern blanking layer of the second embodiment, no additional layer is arranged below the transparent conductive oxide layer 200. It is only required to arrange the optically clear resin 700 and the fourth dielectric layer 600 on the transparent conductive oxide layer 200, and an excellent pattern blanking effect is achieved.

In implementations, in the above ranges of refractive index, there are many choices for the material of the fourth dielectric layer 600. For example, the material of the fourth dielectric layer 600 can be SiOxNy.

Third Embodiment

Figure 6A:
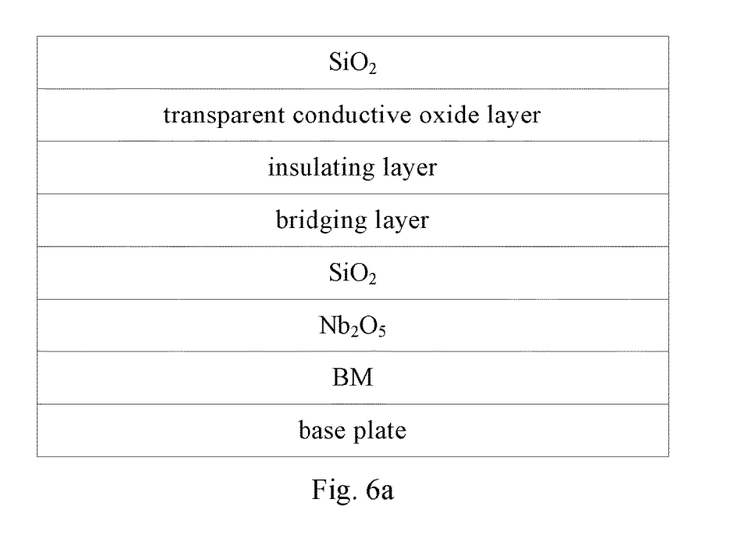
FIG. 6a and FIG. 6b are structural views of a touch panel in an embodiment of the present invention.
Figure 6B:
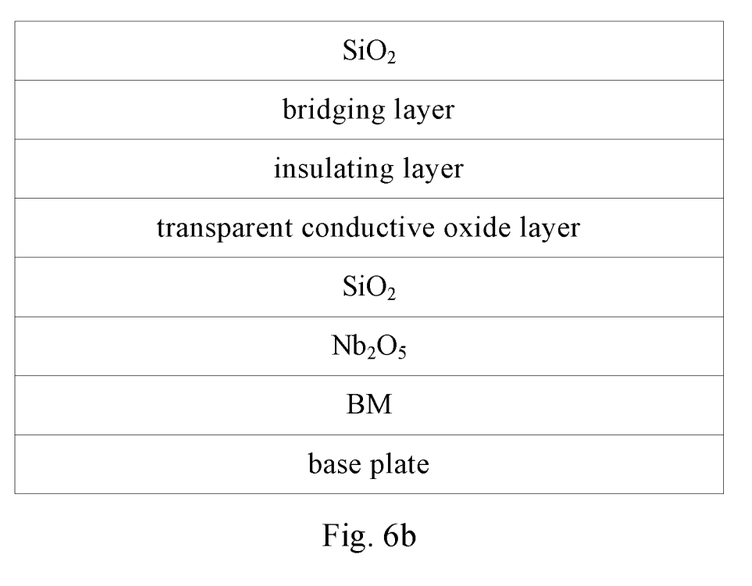

Based on a same inventive concept, an embodiment of the present invention further provides a touch panel, which comprises the above-mentioned transparent conductive oxide pattern blanking structure. As shown in FIG. 6a and FIG. 6b, apart from the pattern blanking layer in the transparent conductive oxide pattern blanking structure and the transparent conductive oxide layer containing a touch electrode pattern, the touch panel generally further comprises a black matrix layer BM, a bridging layer for bridging touch electrodes in X or Y direction, and an insulating layer. As shown in FIG. 6a, the bridging layer can be located below the transparent conductive oxide layer. As shown in FIG. 6b, the bridging layer can also be located over the transparent conductive oxide layer. The present invention is not limited in this aspect.

Fourth Embodiment

Based on a same inventive concept, an embodiment of the present invention further provides a display device, which comprises the above-mentioned transparent conductive oxide pattern blanking structure. The display device can be any product or component with a display function like a mobile phone, tablet computer, TV, monitor, notebook computer, digital photo frame, and navigator. Other essential components that the display device comprises and that a person with ordinary skill in the art should appreciate are not described herein for simplicity, and do not limit the present invention in any way. As for implementations of the display device, reference can be made to embodiments the above-mentioned transparent conductive oxide pattern blanking structure.

Embodiments of the present invention provide a transparent conductive oxide pattern blanking structure, a touch panel, and a display device. A patterned transparent conductive oxide layer is stacked on a base plate, and a pattern blanking layer is adapted to make a pattern of the transparent conductive oxide layer invisible in the visible light. Thus, the pattern blanking layer as a whole layer can be formed during fabricating the pattern of the transparent conductive oxide layer, and there is no need for an attaching or patterning process. Thus, an effect of making the pattern of the transparent conductive oxide layer become invisible in the visible light from clearly visible can be achieved at a low fabricating cost.

Although the present invention has been described above with reference to specific embodiments, it should be understood that the limitations of the described embodiments are merely for illustrative purpose and by no means limiting. Instead, the scope of the invention is defined by the appended claims rather than by the description, and all variations that fall within the range of the claims are intended to be embraced therein. Thus, other embodiments than the specific ones described above are equally possible within the scope of these appended claims. For example, the transparent conductive oxide layer is made from ITO as described above, but the present invention is not limited in this aspect. The material of the transparent conductive oxide layer can be transparent conductive oxides like ATO, AZO, IGZO. In case the transparent conductive oxide layer is made form these transparent conductive oxides, it is only required to accordingly adjust refractive indices and thicknesses of the first, second, third, and fourth dielectric layer. Namely, these variations fall within the scope of the present invention.

The invention claimed is:

1. A transparent conductive oxide pattern blanking structure, comprising a base plate, a patterned transparent conductive oxide layer which is stacked on the base plate, and a pattern blanking layer which is adapted to make a pattern of the transparent conductive oxide layer invisible in the visible light;
   wherein the pattern blanking layer comprises at least one dielectric layer group which is arranged between the base plate and the transparent conductive oxide layer, wherein each of the dielectric layer group comprises at least two dielectric layers which are stacked and have refractive indices decreasing successively in a direction from the base plate to the transparent conductive oxide layer;
   wherein the pattern blanking layer further comprises a third dielectric layer which is arranged on a side of the transparent conductive oxide layer away from the dielectric layer group, wherein the third dielectric layer has a refractive index smaller than that of the transparent conductive oxide layer; and
   wherein the pattern blanking layer further comprises optically clear resin which is arranged on a side of the third dielectric layer away from the transparent conductive oxide layer.

2. The transparent conductive oxide pattern blanking structure of claim 1, wherein each of the dielectric layer group comprises a first dielectric layer and a second dielectric layer on the first dielectric layer, wherein the second dielectric layer has a refractive index smaller than that of the first dielectric layer.

3. The transparent conductive oxide pattern blanking structure of claim 2, wherein the first dielectric layer has a refractive index of 1.9-2.2, and the second dielectric layer has a refractive index of 1.4-1.6.

4. The transparent conductive oxide pattern blanking structure of claim 3, wherein the first dielectric layer is made from $Nb_2O_5$, and the second dielectric layer is made from $SiO_2$.

5. The transparent conductive oxide pattern blanking structure of claim 1, wherein the transparent conductive oxide layer has a refractive index of 1.9, and the third dielectric layer has a refractive index of 1.4-1.9.

6. The transparent conductive oxide pattern blanking structure of claim 5, wherein the third dielectric layer is made from one of $SiO_2$, SiNx, SiNxOy, organic material, or a combination thereof.

7. The transparent conductive oxide pattern blanking structure of claim 1, wherein the pattern blanking layer comprises a fourth dielectric layer and optically clear resin which are arranged on the transparent conductive oxide layer successively, wherein the fourth dielectric layer has a refractive index smaller than that of the transparent conductive oxide layer.

8. The transparent conductive oxide pattern blanking structure of claim 7, wherein the transparent conductive oxide layer has a refractive index of 1.9, and the fourth dielectric layer has a refractive index of 1.5-1.9.

9. The transparent conductive oxide pattern blanking structure of claim 8, wherein the fourth dielectric layer is made from SiOxNy.

10. The transparent conductive oxide pattern blanking structure of claim 1, wherein the transparent conductive oxide layer is made from ITO.

11. The transparent conductive oxide pattern blanking structure of claim 1, wherein the first dielectric layer is made from $Nb_2O_5$ with a thickness of 80~130 Å, the second dielectric layer is made from $SiO_2$ with a thickness of 400~500 Å, the transparent conductive oxide layer is made from ITO with a thickness of 400~500 Å, and the third dielectric layer is made from $SiO_2$ with a thickness of 400~500 Å.

12. A touch panel, comprising a transparent conductive oxide pattern blanking structure which comprises a base plate, a patterned transparent conductive oxide layer which is stacked on the base plate, and a pattern blanking layer which is adapted to make a pattern of the transparent conductive oxide layer invisible in the visible light;
   wherein the pattern blanking layer comprises at least one dielectric layer group which is arranged between the base plate and the transparent conductive oxide layer, wherein each of the dielectric layer group comprises at least two dielectric layers which are stacked and have refractive indices decreasing successively in a direction from the base plate to the transparent conductive oxide layer;

wherein the pattern blanking layer further comprises a third dielectric layer which is arranged on a side of the transparent conductive oxide layer away from the dielectric layer group, wherein the third dielectric layer has a refractive index smaller than that of the transparent conductive oxide layer; and wherein the pattern blanking layer further comprises optically clear resin which is arranged on a side of the third dielectric layer away from the transparent conductive oxide layer.

13. The touch panel of claim 12, wherein each of the dielectric layer group comprises a first dielectric layer and a second dielectric layer on the first dielectric layer, wherein the second dielectric layer has a refractive index smaller than that of the first dielectric layer.

14. A display device, comprising the transparent conductive oxide pattern blanking structure of claim 1.

* * * * *